US007858175B2

(12) United States Patent
Hladik et al.

(10) Patent No.: US 7,858,175 B2
(45) Date of Patent: Dec. 28, 2010

(54) FAUX PHOTOBASE

(75) Inventors: Molly L. Hladik, Monmouth, OR (US); David P. Rossing, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1510 days.

(21) Appl. No.: 11/222,704

(22) Filed: Sep. 9, 2005

(65) Prior Publication Data

US 2007/0059444 A1 Mar. 15, 2007

(51) Int. Cl.

*B05D 1/36* (2006.01)
*B05D 3/12* (2006.01)
*B32B 5/16* (2006.01)
*B32B 5/18* (2006.01)
*B32B 5/24* (2006.01)

(52) U.S. Cl. .................... 428/313.5; 428/327; 428/511; 428/514; 428/537.5; 427/361; 427/402

(58) Field of Classification Search ................. 428/323, 428/403–407

See application file for complete search history.

(56) References Cited

U.S. PATENT DOCUMENTS

| | | | | |
|---|---|---|---|---|
| 5,162,289 | A | 11/1992 | Betts et al. | |
| 5,360,657 | A | 11/1994 | Kano et al. | |
| 5,449,402 | A | 9/1995 | Whalen-Shaw | |
| 5,571,557 | A | 11/1996 | De Bastiani et al. | |
| 6,447,841 | B1 | 9/2002 | Mets et al. | |
| 6,531,183 | B1 | 3/2003 | Cason et al. | |
| 6,630,229 | B1 | 10/2003 | Normington et al. | |
| 7,413,796 | B2 * | 8/2008 | Zhou et al. | 428/219 |
| 7,441,886 | B2 * | 10/2008 | Chen | 347/105 |
| 2003/0121634 | A1 * | 7/2003 | Cason et al. | 162/206 |

FOREIGN PATENT DOCUMENTS

| | | |
|---|---|---|
| WO | WO 2004/030917 A | 4/2004 |
| WO | WO 2004/030917 A | 4/2004 |

* cited by examiner

*Primary Examiner*—Ramsey Zacharia

(57) ABSTRACT

An exemplary method for forming a high gloss base includes providing a paper base stock, coating the base stock with a vacuolated particulate plastic pigment, and calendering the coated base stock with a calendering apparatus applying over 1000 pounds per lineal inch (pli) and substantially no thermal energy.

28 Claims, 4 Drawing Sheets

FAUX PHOTOBASE

BACKGROUND

Traditionally, when forming a photobase product on a paper based substrate, a polyethylene coating is extruded onto the desired substrate prior to applying an embossing roller to achieve a desired gloss. The embossing roll can be smooth to achieve high gloss or textured to achieve a variant of gloss levels. While traditional photobase methods produce the desired gloss on a desired substrate, the costs of extruding a polyethylene coating onto the desired substrate is often prohibitive for many manufacturers.

SUMMARY

An exemplary method for forming a high gloss base includes providing a base stock, coating at least one side of the base stock with a coating formulation that includes between approximately 70 and 95% vacuolated particulate plastic pigment, and calendering the coated base stock. The calendering of the coated base stock includes passing the coated base stock through a calender device including at least two mating rolls maintaining a nip load of more than 1000 pounds per linear inch, the mating rolls being maintained substantially at room temperature.

Similarly, a high gloss paper product includes a paper base stock and a coating that includes between approximately 70 and 95% vacuolated particulate plastic pigment, and demonstrating a TAPPI gloss level, at both 20 and 75 degrees reflectance, of between approximately 90 and 100.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary method and apparatus for forming a low cost image supporting medium having high gloss is described herein. More specifically, according to one exemplary embodiment, the present system and method produce a high gloss base that may be used to make photo media at a reduced cost and increased ease. The present specification discloses exemplary systems and methods for forming the image supporting medium as well as exemplary compositions thereof.

As used in this specification and in the appended claims, the term "paper base stock" is meant to be understood as any unextruded paper that includes fibers, fillers, additives, and the like, used to form an image supporting medium. Similarly, the terms "image supporting medium" and "photo base paper" will be used interchangeably to refer to a coated raw base paper that has no inkjet coating formulation disposed thereon. Further, the term "gloss" shall be understood herein as the specular reflection of light from a substrate surface, incident and reflected at various angles from normal. Moreover, the term "super high gloss" will be understood as TAPPI gloss value of greater than 85, as determined at a 75 degree angle of reflectance.

In the following description, for purposes of explanation, numerous specific details are set forth in order to provide a thorough understanding of the present system and method for forming a low cost, high gloss image supporting medium. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places of the specification are not necessarily all referring to the same embodiment.

Exemplary Structure

Figure 1A:
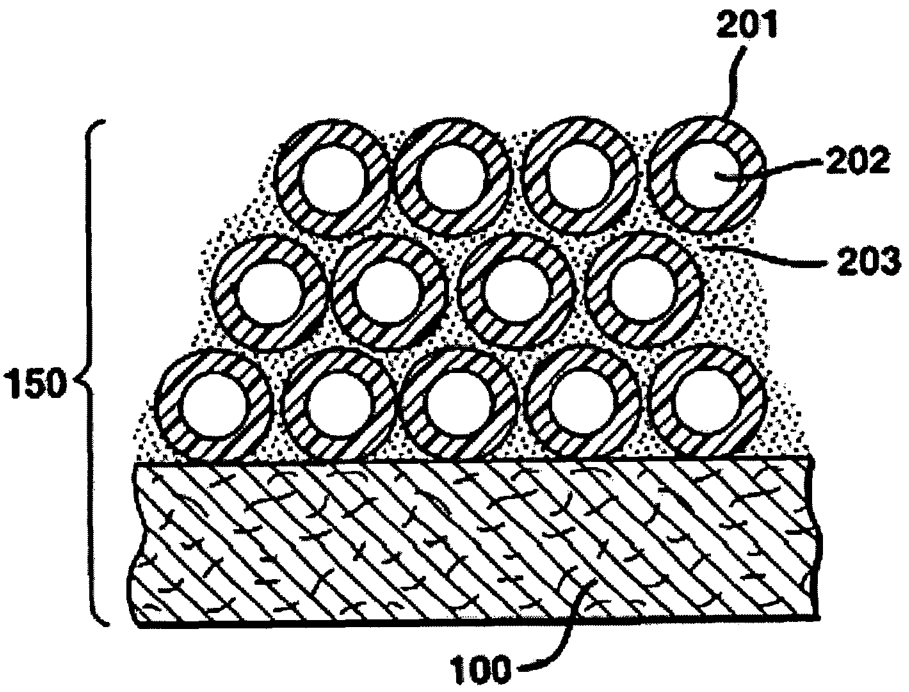
FIG. 1A is a cross-sectional representation of a base stock coated with a layer of a coating formulation comprised of hollow polymer pigment particles according to one exemplary embodiment.
Figure 1B:
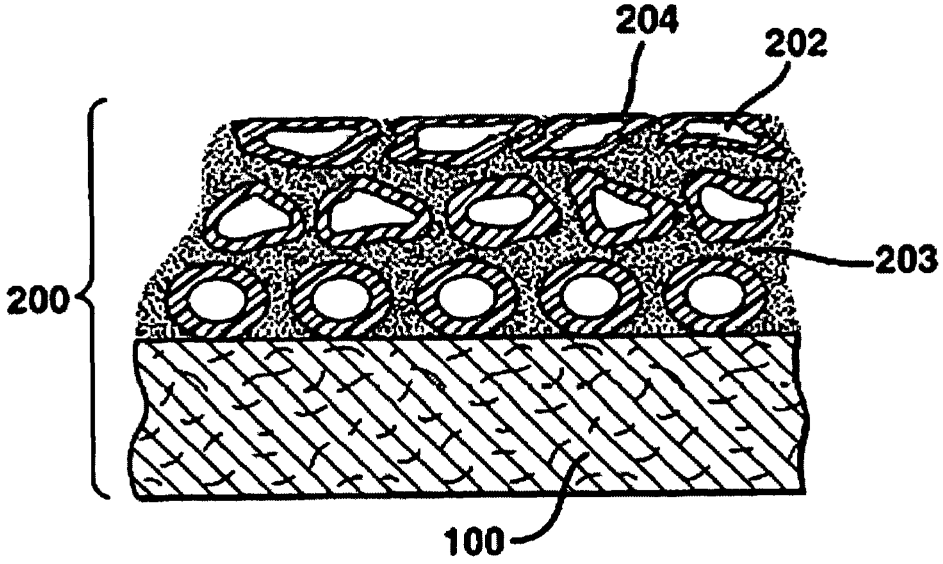
FIG. 1B is a cross-sectional representation of a coated base stock after calendering according to one exemplary embodiment.

FIGS. 1A and 1B illustrate a number of cross-sectional representations of a coated base-stock having a super high gloss according to one exemplary embodiment. According to the exemplary embodiment illustrated in FIG. 1A, the present coated base-stock having a super high gloss (150) includes a base stock (100) coated on at least one side with a number of hollow plastic pigment particles (201), each particle having a hollow core or vacuole (202). The hollow plastic pigment particles (201) are surrounded by and coupled to the base stock (100) by a matrix (203) that may include a number of binders, additional pigments, and/or other additives. Once the above-mentioned coated base-stock having a super high gloss (150) is formed, a finishing process is performed that compresses the hollow plastic pigment particles (201) to form a flattened and smoothed surface (204) of the calendered coated base-stock having a super high gloss (200), as illustrated in FIG. 1B. Specific details of the various components of the coated base-stock having a super high gloss (150), as well as an exemplary system for forming the calendered coated base-stock having a super high gloss (200) will be described in further detail below.

Exemplary Formulation

As mentioned above with reference to FIGS. 1A and 1B, the coated base-stock having a super high gloss (150) includes a coating formulation formed on a surface of a base stock (100) prior to a number of surface finishing processes. According to one exemplary embodiment, the "base stock" (100) may be a dried web or sheet or material otherwise formed from a paper furnish comprised of wood pulp and, optionally, other additives. Preferably, the pulp is a comprised mainly of chemical pulp, but the furnish may contain, if desirable, other types of pulp including mechanical pulp, semi-chemical pulp, recycled pulp, pulp containing other natural fibers, synthetic fibers, and any combination thereof. The paper or paperboard products of the present invention typically, however, contain less than 60% by weight of mechanical pulp. The base stock may be of any suitable fiber composition having a uniform dispersion of cellulosic fibers alone or in combination with other fiber materials, such as natural or synthetic fiber materials. Examples of suitable substrates include previously coated or uncoated paper or paperboard stock of a weight ranging from about 37 to about 115 lbs./ream. For example, the substrate may be a 115 lbs./ream paper stock manufactured by Westvaco Corporation.

On top of the exemplary base stock (100), a coating formulation is deposited. According to one exemplary embodiment, between approximately 70 and 95% of the coating formulation comprises hollow plastic pigment particles (201) and approximately 10% binder matrix (203).

The coating formulation suitably comprises a vacuolated or solid particulate plastic pigment. During the finishing process, the surfaces of the particulate plastic pigment are compacted into an orientation parallel to the plane of the surface of the base stock. The surfaces of the polymer particles provide a smooth layer and therefore increase reflectance of light, and, accordingly, glossiness of the coated, finished surface. While solid particulate plastic pigments may be used, preferably, the plastic pigment is comprised of vacuolated particles of a suitable polymer material. The term "vacuolated" means that the pigment particles include one or more hollow voids or vacuoles within the particle. For example, the particle may be formed with a single void at its core, as a hollow sphere, or it may include several voids. When the vacuolated particles are pressed during a finishing operation such as calendering, the vacuoles are not completely flattened, and accordingly, a higher bulk is retained after compaction than would be achieved using a non-particulate pigment, or after using a pigment in the form of solid particles without voids. The particulate plastic pigment used is suitably of a size to permit the desired gloss development, the particle diameter being restricted only by the limitations of the process used in manufacturing the pigment, and any limitations imposed by printing requirements for the paper product. Particle sizes may therefore be 0.1 micron or more in diameter, for example, up to or exceeding about 1.0 micron.

Suitable vacuolated pigments include polystyrenes and acrylic polymers, including, but not limited to, methyl-methacrylate, butyl-methacrylate and alphamethyl styrene. The particulate plastic pigment may be used as a latex, preferably in an aqueous medium. An example of a particulate pigment is "HP-1055", which is a hollow sphere pigment commercially available from Rohm & Haas. This pigment is made of styrene-acrylic copolymer, and has a particle diameter of about 1.0 micron.

Optionally, the coating formulation may further comprise a second particulate plastic pigment, which may be in the form of solid or vacuolated particles of varying size, for example from about 0.20 to about 0.45 micron in diameter. This second pigment may be blended with the first particulate plastic pigment to provide optimal light-scattering properties, such as opacity, without loss of bulk and gloss.

Additionally, the coating formulation may also include a number of pigments including, but in no way limited to, ground or precipitated calcium carbonate, or clays including No. 1 or No. 2 clays and kaolin clay.

According to one exemplary embodiment, approximately 90% of the coating formulation comprises hollow plastic pigment particles (201) and approximately 10% binder matrix (203). However, the hollow plastic pigment particles (201) may comprise from between approximately 70 to 95% by volume of the coating formulation. By incorporating a higher than traditional amount of hollow plastic pigments, a super high gloss finish may be achieved without the application of thermal energy, as will be described in further detail below.

In addition to the hollow plastic pigment particles (201), the balance of the coating formulation includes a binder matrix (203) sufficient to couple the hollow plastic pigment particles (201) to the exemplary base stock (100). According to one exemplary embodiment, the binder matrix (203) may include, but is in no way limited to a combination of: binders, opacifiers, whitening agents, pigments, starch, polyvinyl alcohol (PVA), polyvinyl acetate (PVAc), styrene-butadiene latex, carboxymethylcellulose (CMC), titanium dioxide ($TiO_2$), calcined clay, optical brighteners, tinting agents, dyes, dispersants and insolubilizers. Exemplary methods for formulating and applying the above coating formulation will be described in detail below with reference to FIGS. 2-4.

Exemplary Method

Figure 2:
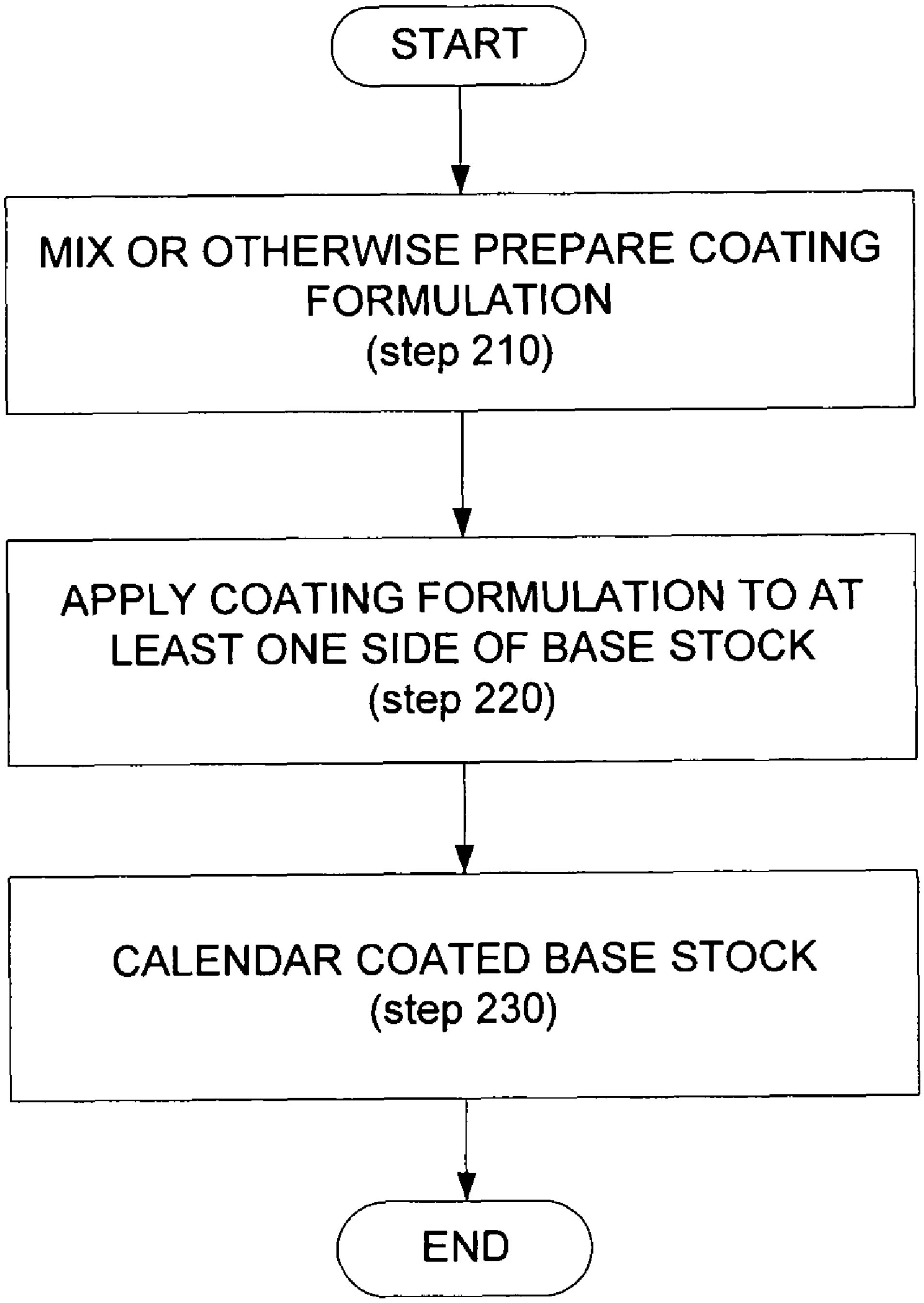
FIG. 2 is a flow chart illustrating a method for forming a high gloss base for photo media, according to one exemplary embodiment.

FIG. 2 illustrates an exemplary method for forming a super high gloss on a coated base stock, according to one exemplary embodiment. As illustrated in FIG. 2, the exemplary method begins by first mixing the coating formulation (step 210) and applying the coating formulation to at least one side of the base stock (step 220). Once the base stock is coated with the coating formulation (step 220), the coated base stock is passed through a calendering device configured to generate the desired super high gloss (step 230). Further details of the above-mentioned method will be described in detail below.

As mentioned above, the present exemplary method begins by first mixing or otherwise preparing the coating formulation (step 210). According to one exemplary embodiment, the coating formulation may be formulated by mixing together the various ingredients in a one-tank make down or by premixing then combining separate ingredients. When used, starch or PVA is pre-cooked before it is combined with the other ingredients. The mixture is continually agitated to homogenize the ingredients. The resulting formulation may be of a viscosity ranging from approximately 200 cPs to approximately 6000 cPs, preferably from about 300 cPs to about 4000 cPs (Brookfield No. 4 spindle, 20 rpm) depending on the coating method. The solids content of the coating composition when it is used, for example, in a blade coater, may desirably be as high as from approximately 70% to approximately 95% by weight. While the range of pH varies according to the type of additives included in the formulation, it is recognized that the pH of the coating formulations may typically range from approximately 7 to about 10.

Once prepared, the coating formulation is applied to at least one side of the base stock (step 220). According to the present exemplary embodiment, the coating formulation may be applied at a dry coat weight of from approximately 2.5 to about 12 lbs./ream/side, where the ream size is about 3300 lbs/ft$^2$. The coating formulation may be applied to the base stock as a single layer, in multiple layers, or as the final layer atop one or more other coating layers. Regardless of the coating option selected, the coating formulation preferably achieves a final basis weight of from approximately 50 to approximately 200 lbs./ream in the finished product.

According to one exemplary embodiment, the coating formulation may be applied to at least one side of the base stock (step 220) by any number of suitable methods including, but in no way limited to, bar or rod coating, knife or doctor blade coating, roll coating, spray coating, flooding, or any combination thereof.

Figure 3:
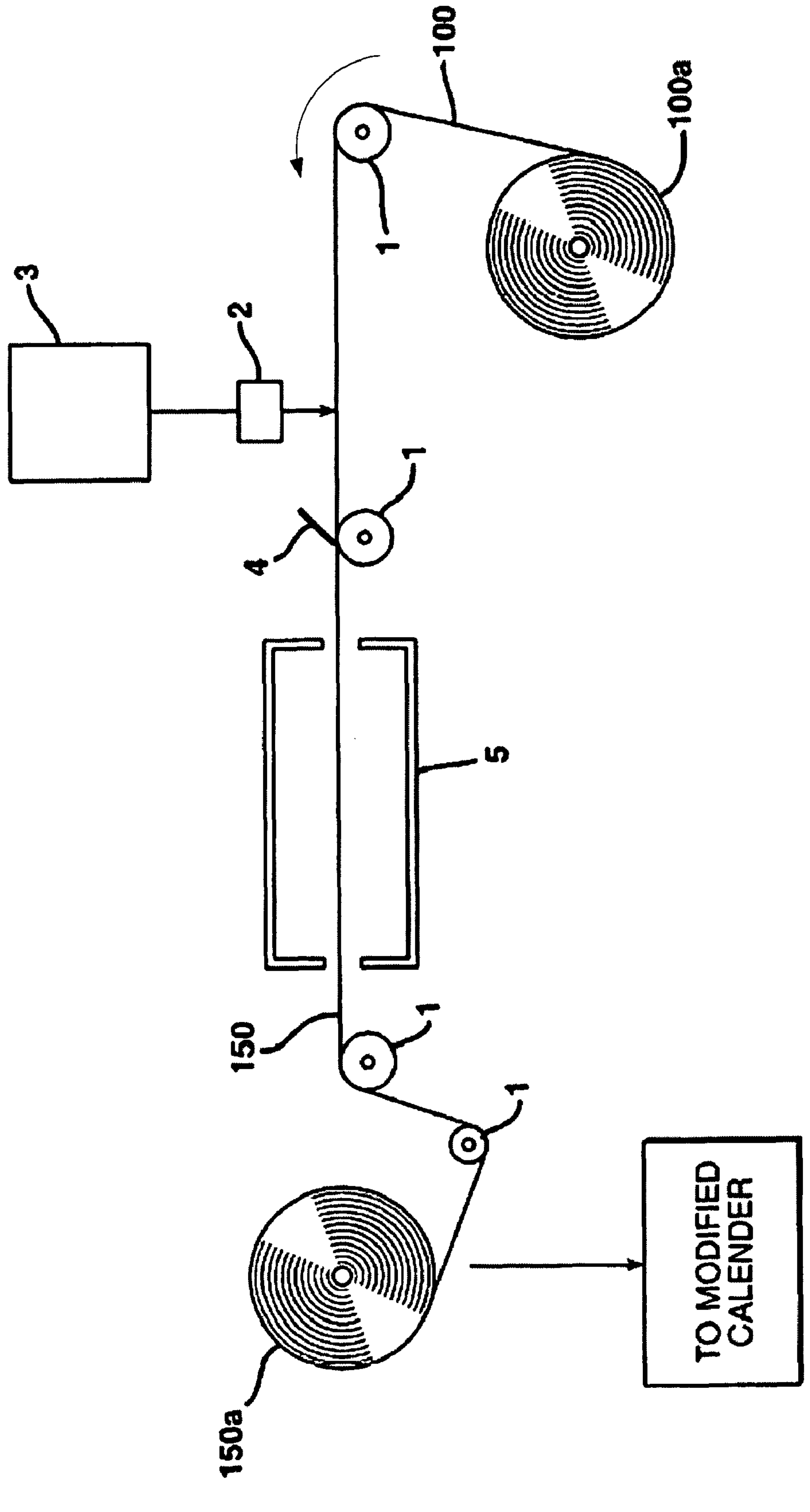
FIG. 3 is a schematic representation of a process for coating a base stock before calendering, according to one exemplary embodiment.

According to one exemplary embodiment illustrated in FIG. 3, the coating formulation is applied, off-line or in-line, to at least one side of a base stock using a blade coater, in a substantially uniform thickness over the surface of the base stock. According to the exemplary embodiment illustrated in FIG. 3, a web of base stock (100) may be unwound from a roll (100*a*) and passed via rollers or guides (1) through a coating apparatus such as a blade coater, which may include a delivery means (2), a reservoir (3) and/or a metering device, for example a doctor blade (4). According to the illustrated exemplary embodiment, the delivery means (2) for transferring the coating formulation to the web may, for example, be a rotating roll, pump, or gravity-fed pipe in flow communication with the reservoir (3), which, in turn, may be continually replenished from a coating formulation mixing tank (not shown). As mentioned previously, the reservoir (3) is agitated constantly to maintain homogeneity of the formulation.

When coating the base stock (100), the delivery means (2) contacts and continuously deposits the coating formulation on the surface of the base stock. After the coating formulation is deposited on the surface of the base stock (100), any excess coating formulation is removed as the base stock passes under the doctor blade (4), which is set at an angle to provide a scraping action that removes the excess coating formulation from the surface of the base stock (100) and evenly distributes the remaining coating formulation across the surface. The angle of the doctor blade (4) may be adjusted depending on the desired thickness of the coating. After the coating is applied and the excess coating formulation is removed, the coated base stock (150) that is formed may then be passed or drawn through a drier apparatus (5), such as an oven, an infra-red drier or other drying device, in which the coating is dehydrated and solidified onto the web surface. Any conventional oven may be used, with the operating temperature selected according to the line speed, amount and thickness of coating, the water content and the temperature sensitivity of the coating ingredients.

Figure 4:
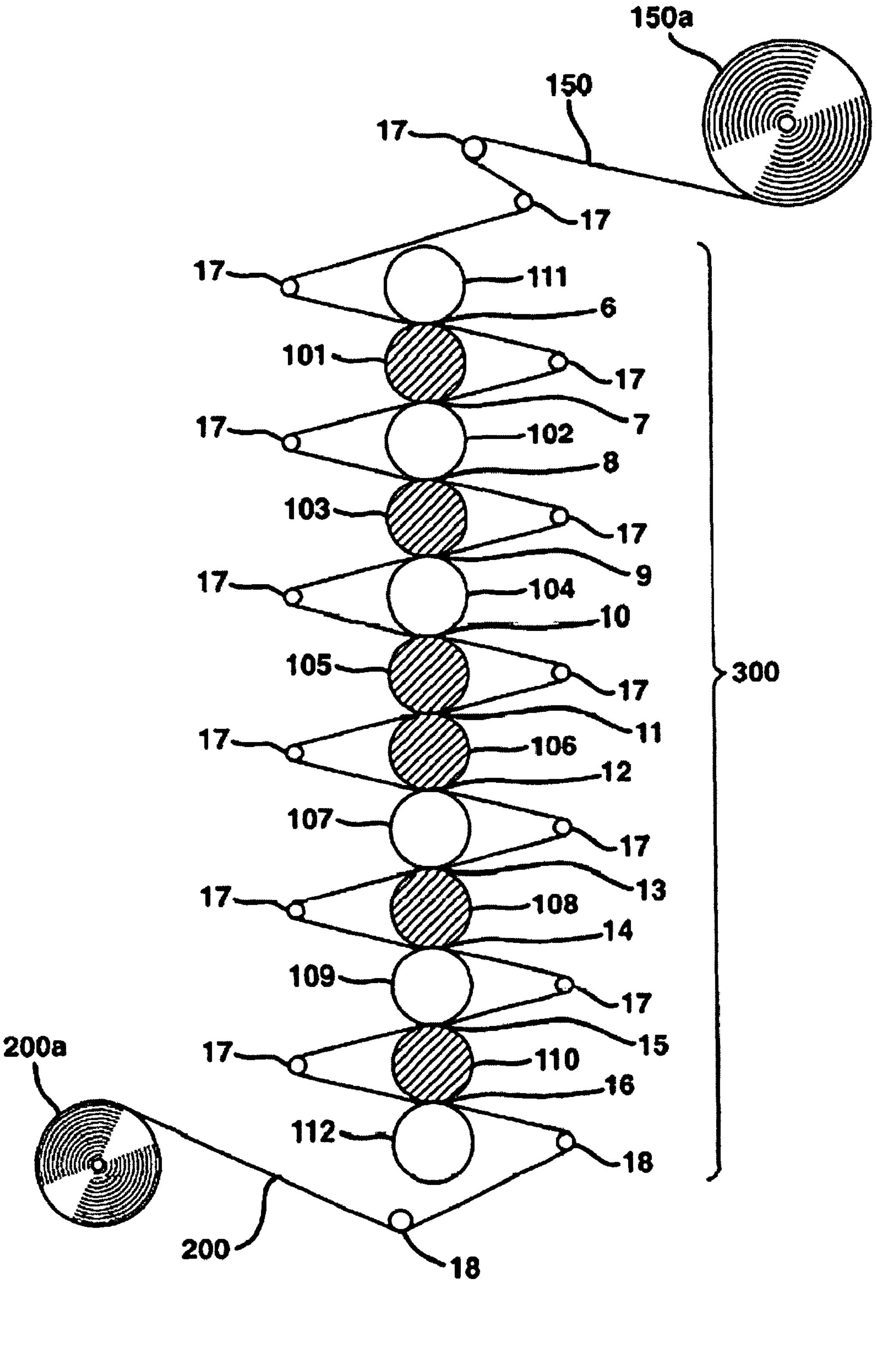
FIG. 4 is a schematic representation of a process for finishing a coated paper using a modified multi-nip calender device according to one exemplary embodiment.

After the coating formulation is applied and dried, the coated base stock (150) may be collected, as in a roll (150*a*) or in any other suitable form for subsequent processing, such as calendering (step 230). Alternatively, the coated base stock (150) may be formed and then immediately finished in an in-line process. In an exemplary embodiment shown in FIG. 4, the coated base stock (150) is unwound from a roll (150*a*) and drawn through a modified calender (300). According to one exemplary embodiment illustrated in FIG. 4, the modified calender 300 may be a multi-nip supercalender. Alternatively, a number of alternative calendar devices may be used for smoothing the surface of the coated base stock (150). As illustrated in the exemplary embodiment of FIG. 4, the multi-nip supercalender includes a linear arrangement of from 6-14 hard and soft rolls. The linear arrangement of the rolls may be vertical, inclined or horizontal. For example, as shown in FIG. 4, such a calender is comprised of a series of intermediate rolls (101-110) that are vertically aligned between an upper roll (111) and a lower roll (112), in which the arrangement of the rolls has been modified to provide a substantially uniform load at each successive nip. By using the modified calender, it is possible to control or manipulate the load at each nip in a calender stack, and if desired, run higher loads in the top of the calender stack and lower loads at the bottom compared to conventional supercalenders.

According to one exemplary embodiment, the modified calender (300) may be equipped with from 5 to 13 nips, each nip being formed between a pair of rolls. The rolls (101-112) may be either hard or soft rolls. Hard rolls (102, 104, 107, 109, 111 and 112) may typically have an outer surface formed of steel or other non-corrosive non-yielding conductive material. The soft rolls (101, 103, 105, 106, 108 and 110) may be surfaced with a polymer coating, fiber or other pliable material. The upper, lower and intermediate rolls may typically be crown-compensated such that the load is varied across the machine width of the roll for fine-tuning of the web substrate caliper profile.

According to the present exemplary embodiment, the calendering step may be performed at line operating speeds of from approximately 500 to 5000 μm. In contrast to traditional calendering methods, the present exemplary calendering step is performed without heating any of the rolls. By enabling the formation of super high gloss coated base stock without the heating of the calendering rolls, a number of previously unutilized manufacturing resources may be used and the super high gloss coated base stock may be produced at reduced costs. According to the exemplary embodiment illustrated in FIG. 4, the coated base stock (150) enters the modified calender (300) and is drawn through a first nip (6) set at a nip load, for example, of over 1000 psi. This initial load may, according to one exemplary embodiment, be varied from at least 1000 pli to approximately 2500 pli, to provide the desired gloss and density. The web is subsequently passed through a series of nips (7-15), via guides (17), then through a final nip (16), the load at each nip being substantially uniform in relation to the other nips in the series. According to the present exemplary embodiment, the inclusion of nip loads in excess of 1000 pli and the elimination of heat reduce the cost of forming a super high gloss coated base stock.

Once processed, the calendered paper product (200) may be passed over one or more guides (18) and wound, via any conventional means, into a roll (200*a*), or otherwise packaged. The finished paper product may then be subjected to any number of conventional post-finishing operations, such as printing, cutting, folding, and the like, depending on the intended use.

According to one exemplary embodiment, the above-mentioned method produces an inexpensive coated base stock having super high gloss properties. More particularly, the above-mentioned methods were used to produce an inexpensive coated base stock that exhibited a TAPPI gloss level, at both 20 and 75 degrees reflectance, of between approximately 90 and 100, as will be illustrated by the example below.

Examples

According to one exemplary embodiment, a number of the above-mentioned systems and methods were implemented to generate a number of coatings to be formed on paper base stock. Two exemplary formulations are illustrated below in tables 1 and 2.

TABLE 1

| Ingredient | Description | Weight Percent |
|---|---|---|
| Ropaque HP-1055 | Styrene-Acrylic Vacuolated Particles | 89.6% |
| Mowiol 20-98 | Binder | 8.9% |
| Curesan 200 | Crosslinker | 0.5% |
| Triton X405 | Surfactant | 1.0% |
| Totals | | 100% |

TABLE 2

| Ingredient | Description | Weight Percent |
|---|---|---|
| Ropaque AF-1055 | Vacuolated Particles | 82.6% |
| Mowiol 20-98 | Binder | 8.3% |

TABLE 2-continued

| Ingredient | Description | Weight Percent |
|---|---|---|
| Curesan 200 | Crosslinker | 0.8% |
| Duroset Elite Plus | Binder | 8.3% |
| Totals | | 100% |

The above-mentioned formulations prepared according to the present exemplary systems and methods were coated onto a paper base stock with a coating thickness of approximately 20 grams per square meter (gsm). Once applied to the standard paper base stock, the coated paper was passed through an unheated calendar device. 3000 psi was applied to the paper coated with the formula of Table 1, while 3500 psi was applied to the paper coated with the formula of Table 2. Once each of the coated papers was calendared, they were each tested for TAPPI gloss level. When tested, both of the above-mentioned formulations, prepared as indicated above, produced gloss levels at both 20 and 75 degrees reflectance of between approximately 90 and 100.

In conclusion, the present system and method provide an exemplary system and method for forming an inexpensive coated base stock having super high gloss properties. More specifically, by applying a coating formulation of between approximately 70 and 95% hollow plastic pigment particles by volume onto a base stock, a calendering process substantially void of thermal energy may be performed to achieve a super high gloss. Specifically, inexpensive coated base stock may be produced having a TAPPI gloss level, at both 20 and 75 degrees reflectance, of between approximately 90 and 100.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A method of producing a coated base stock with a super high gloss comprising:

providing a base stock;

coating at least one side of said base stock with a coating formulation, said coating formulation including between approximately 70 and 95% vacuolated particulate plastic pigment by volume, said coating formulation demonstrating a TAPPI gloss level, at both 20 and 75 degrees reflectance, of between approximately 90 and 100; and calendering said coated base stock, wherein said calendering includes passing said coated base stock through a calender device including at least two mating rolls maintaining a nip load of more than 1000 pounds per linear inch, said mating rolls being maintained substantially at room temperature.

2. The method of claim 1, wherein said method forms a coated base stock having a TAPPI gloss level, at both 20 and 75 degrees reflectance, of between approximately 90 and 100.

3. The method of claim 1, further comprising applying multiple layers of said coating formulation on a first side of said base stock before said base stock is passed through said calender device.

4. The method of claim 1, wherein said vacuolated particulate plastic pigment has an average diameter of up to about 1.0 micron.

5. The method of claim 1, wherein said vacuolated particulate plastic pigment comprises one of a polystyrene or an acrylic polymer.

6. The method of claim 5, wherein said vacuolated particulate plastic pigment comprises one of a methyl-methacrylate, a butyl-methacrylate, or an alphamethyl styrene.

7. The method of claim 1, wherein said coating formulation comprises a first and a second particulate plastic pigment, said first particulate plastic pigment including said vacuolated particulate plastic pigment.

8. The method of claim 7, wherein said second particulate plastic pigment comprises one of a solid or a vacuolated particle.

9. The method of claim 1, wherein said coating formulation further comprises one of a ground calcium carbonate, a precipitated calcium carbonate, or a clay.

10. The method of claim 1, wherein said coating formulation further comprises between approximately 5 and 25% binder matrix by volume configured to couple said particulate plastic pigment to said base stock.

11. The method of claim 10, wherein said binder matrix comprises a binder.

12. The method of claim 11, wherein said binder comprises one of a styrene acrylic, a polyvinyl alcohol (PVA), or a butadiene.

13. The method of claim 11, wherein said binder comprises one of an opacifier, a whitening agent, pigments, starch, polyvinyl acetate (PVAc), styrene-butadiene latex, carboxymethylcellulose (CMC), titanium dioxide ($TiO_2$), calcined clay, optical brighteners, tinting agents, dyes, dispersants, or insolubilizers.

14. The method of claim 1, wherein said calender device comprises one of a gloss calender, a soft calender, or a supercalender.

15. The method of claim 1, wherein said coating formulation further comprises a second particulate plastic pigment;

said second particulate plastic pigment including solid or vacuolated particles having diameters between approximately 0.20 to approximately 0.45 micron.

16. A photobase material comprising:

a paper base stock; and a coating formulation including between approximately 7° and 95% vacuolated particulate plastic pigment by volume;

said coating formulation demonstrating a TAPPI gloss level, at both 20 and 75 degrees reflectance, of between approximately 90 and 100, in which said coating formulation is maintained at room temperature during calendering.

17. The photobase material of claim 16, wherein said vacuolated particulate plastic pigment has an average diameter of up to about 1.0 micron.

18. The photobase material of claim 16, wherein said vacuolated particulate plastic pigment comprises one of a polystyrene or an acrylic polymer.

19. The photobase material of claim 18, wherein said vacuolated particulate plastic pigment comprises one of a methyl-methacrylate, a butyl-methacrylate, or an alphamethyl styrene.

20. The photobase material of claim 16, wherein said coating formulation comprises a first and a second particulate plastic pigment, said first particulate plastic pigment including said vacuolated particulate plastic pigment.

21. The photobase material of claim 20, wherein said second particulate plastic pigment comprises one of a solid or a vacuolated particle.

22. The photobase material of claim 21, wherein said second particulate plastic pigment comprises a size varying between approximately 0.20 to approximately 0.45 micron in diameter.

23. The photobase material of claim 16, wherein said coating formulation further comprises one of a ground calcium carbonate, a precipitated calcium carbonate, or a clay.

24. The photobase material of claim 16, wherein said coating formulation further comprises between approximately 5 and 25% binder matrix by volume configured to couple said particulate plastic pigment to said base stock.

25. The photobase material of claim 24, wherein said binder matrix comprises a binder.

26. The photobase material of claim 25, wherein said binder comprises one of a styrene acrylic, a polyvinyl alcohol (PVA), or a butadiene.

27. The photobase material of claim 25, wherein said binder comprises one of an opacifier, a whitening agent, pigments, starch, polyvinyl acetate (PVAc), styrene-butadiene latex, carboxymethylcellulose (CMC), titanium dioxide ($TiO_2$), calcined clay, optical brighteners, tinting agents, dyes, dispersants, or insolubilizers.

28. A method of forming the photobase material of claim 16, said method comprising maintaining said coating formulation at room temperature during calendaring.

* * * * *